United States Patent Office 3,457,302
Patented July 22, 1969

3,457,302
PROCESS FOR THE PREPARATION OF TERTIARY AMINO ACIDS
Franklin Boardman, Morristown, N.J., assignor to Allied Chemical Corporation, New York, N.Y., a corporation of New York
No Drawing. Filed May 27, 1966, Ser. No. 554,291
Int. Cl. C07c *99/00*
U.S. Cl. 260—534                                    8 Claims

ABSTRACT OF THE DISCLOSURE

An improved process for the preparation of tertiary amino carboxylic acids by the reaction of halogen substituted carboxylic acids with secondary aliphatic amines. The improvement comprises treating the reaction product of the secondary amine and the halogen substituted carboxylic acid with from 0.8 to 1.2 mols of alkali metal hydroxide per mole of halogen-substituted carboxylic acid in a polar solvent and thereafter recovering the desired tertiary amino carboxylic acid without having converted same into its alkali metal salt.

---

This invention relates to an improved process for the preparation of tertiary amino acids. More particularly, this invention relates to an improved process for obtaining tertiary amino acids by the reaction of halogen-substituted carboxylic acids with secondary aliphatic amines.

In U.S. Patent 2,203,009 of Calcott et al., there is disclosed a method of preparing N-tertiary amino acids by reacting a halogen-substituted carboxylic acid with a dialkylamine to form a dialkyl amino carboxylic acid fixed as the salt of the dialkylamine and dialkylamine hydrohalide salt. Sufficient alkali metal hydroxide is then added to the reaction mixture to convert the amine salt of the dialkyl amino carboxylic acid to free dialkylamine and the alkali metal salt of the desired tertiary amino acid and to convert the dialkylamine hydrohalide salt to alkali metal halide and free dialkylamine, the amount of alkali metal hydroxide required being at least about 2 mols per mol of halogen-substituted carboxylic acid initially employed. To obtain the free tertiary amino carboxylic acid from its alkali metal salt, Calcott et al. dissolved it in hot alcohol and then neutralized it with HCl to give the desired free acid and alkali metal halide which precipitated. After removing the precipitated alkali metal halide, the free amino acid was recovered by evaporating the alcohol solvent. In practicing this method, the lengthy and expensive steps required to recover the desired amino acid from its fixed amino salt adversely affects the economics of the process.

It is therefore an object of the present invention to provide an improved process for the preparation of tertiary amino acids.

A further object of this invention is to improve the process of preparing tertiary amino acids by the reaction of halogen-substituted carboxylic acids with secondary aliphatic amines by providing a novel method of recovering free amino acids from their corresponding fixed amine salts.

Additional objects and advantages of this invention will be apparent from the following detailed description thereof.

In accordance with the present invention, N-tertiary amino carboxylic acids of the formula

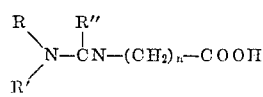

where R and R' are aliphatic hydrocarbon radicals containing 1 to 5 carbon atoms, R'' is hydrogen or an alkyl radical of 1 to 20 carbon atoms and $n$ is an integer of 0 to 2, are prepared by first reacting a halogen-substituted carboxylic acid of the formula $$\text{X}-\overset{\text{R}''}{\underset{|}{\text{C}}}\text{H}-(\text{CH}_2)_n-\text{COOH}$$

where X is chlorine, bromine or iodine and R'' and $n$ have the meanings given above with a secondary amine of the formula

where R and R' have the meanings given above to give a reaction mixture containing an N-tertiary amino carboxylic acid fixed as a salt of the secondary amine and the hydrohalide salt of the secondary amine. This reaction mixture is then treated with about one mol, more particularly, 0.8 to 1.2 mols, of alkali metal hydroxide for each mol of the halogen-substituted carboxylic acid used, in a reaction medium containing a polar solvent which dissolves both the alkali metal hydroxide and the desired amino acid; whereby the hydrohalide salt of the secondary amine is converted to the secondary amine, alkali metal halide salt and water and the amine salt of the N-tertiary amino carboxylic acid decomposes to form the free acid and secondary amine. The reaction product thus obtained contains the desired free amino acid, alkali metal halide, free amine, water and polar solvent. The free amino acid is recovered by removing any alkali metal halide present as precipitate, distilling off the volatile components including the secondary amine, water and solvent and then purifying the amino acid by recrystallization from a nonpolar solvent.

A critical feature of this invention is the use of only about one mol of alkali metal hydroxide for each mol of halogen-substituted acid rather than 2 or more mols as employed by Calcott et al. It has been discovered that the alkali metal hydroxide reacts preferably with the hydrohalide salt of the secondary amine and that by using the above-defined quantity of alkali metal hydroxide, the hydrohalide salt is converted to free secondary amine, alkali metal halide salt and water without converting the amine salt of the N-tertiary amino carboxylic acid to its corresponding alkali metal salt. Further it has been found that in the substantially neutral solution obtained, the amine salt of the N-tertiary amino carboxylic acid decomposes into the free acid and the amine. This free acid can be readily separated by the above-described procedure and all the steps of U.S.P. 2,203,009 relating to the recovery of the free amino acid from its alkali metal salts are eliminated.

The following equations represent the reactions involved in the present process.

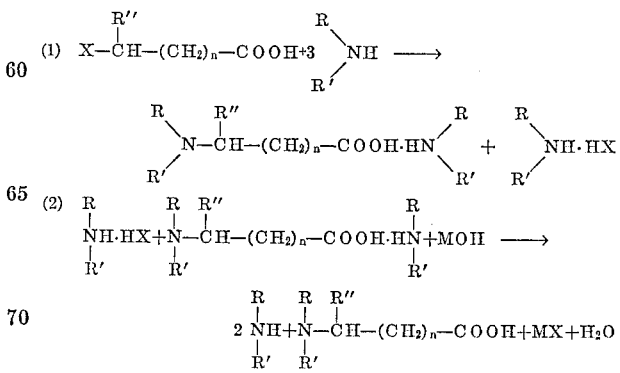

where M is an alkali metal and R, R', R", X and $n$ have the meanings given above.

The reaction between the halogen-substituted carboxylic acid and the secondary amine is preferably carried out using at least 3 mols of the amine per mol of the acid. A reaction temperature of about 0 to 150° C. can be employed with a temperature of about 20 to 125° C. being preferred. Illustrative of suitable halogen-substituted carboxylic acids are chloroacetic acid, bromoacetic acid, iodoacetic acid, α-chloropropionic acid, β-bromopropionic acid, α-bromopropionic acid, α-bromobutyric acid and β-chlorostearic acid. Suitable secondary amines include saturated aliphatic amines such as dimethylamine, diethylamine, di-n-propylamine, di-n-butylamine, and di-amylamine and unsaturated aliphatic amines such as divinylamine and diallylamine.

After the halogen-substituted carboxylic acid and the secondary amine have reacted, the reaction mixture is treated with an alkali metal hydroxide, preferably sodium or potassium hydroxide. Preferably one mol of alkali metal hydroxide is used for each mol of halogen-substituted carboxylic acid employed, but the amount of alkali metal hydroxide can be from about 0.8 to 1.2 mols per mol of said halogenated acid. A polar solvent which dissolves both the alkali metal hydroxide and the amino acid to be produced should be present in the reaction medium during the treatment with alkali metal hydroxide. Illustrative of such solvents are methanol and ethanol.

Part of the alkali metal halide formed during this reaction precipitates out and is readily removed by filtration leaving a liquid product containing secondary amine, amino carboxylic acid, solvent, water and some dissolved alkali metal halide. The secondary amine, water and solvent are removed by distillation. The amino carboxylic acid is then purified by recrystallization from a nonpolar solvent. Alkali metal halides being insoluble in nonpolar solvent are readily separated in this step. Suitable nonpolar solvents include tetrahydrofuran, carbon tetrachloride, chloroform, ethyl acetate, dioxane, methylene chloride and acetone.

The following examples are given to further illustrate the process of the invention, but it is to be understood that the examples are not meant to limit the invention to the details described therein. In the examples parts are by weight.

Example 1

18.9 parts of chloroacetic acid and 58.2 parts of diallylamine were admixed and heated at 100° C. for 16 hours under a nitrogen atmosphere. The mixture was cooled to room temperature and 11.2 parts of potassium hydroxide, dissolved in 200 parts of methanol was added (potassium hydroxide to chloroacetic acid mol ratio of 1 to 1). The mixture was shaken for 5 minutes and filtered. The filtrate was evaporated under vacuum to a red oil. The residue was dissolved in 300 parts of chloroform, filtered, the filtrate dried over magnesium sulfate, and the solvent evaporated. The solid product was recrystallized from tetrahydrofuran.

Diallylglycine was obtained in 61% yield as tan crystals having a melting point of 109° C.

Example 2

13.9 parts of bromoacetic acid and 27.1 parts of diallylamine were admixed and heated at 100° C. for 16 hours under a nitrogen atmosphere. The mixture was cooled to room temperature and 5.6 parts of potassium hydroxide, dissolved in 100 parts of methanol, was added (potassium hydroxide to bromoacetic acid mol ratio of 1 to 1). The mixture was shaken for 5 minutes and filtered. The filtrate was evaporated under vacuum to a red oil. This oil was dissolved in 60 ml. of chloroform, filtered, the filtrate dried over magnesium sulfate, and solvent evaporated. The solid product was recrystallized from tetrahydrofuran.

Diallylglycine was obtained in 84% yield as a white crystalline solid having a melting point of 110–112° C.

Example 3

9.45 parts of chloroacetic acid and 64.5 parts of dibutylamine were mixed and heated at 100° C. for 16 hours in air. The mixture was cooled and 5.6 parts potassium hydroxide were added. After shaking thoroughly, the solvent and excess amine were evaporated. The white paste which remained was dissolved in 126 parts of 1,2-dichloroethane and the salt filtered off. The solvent was evaporated leaving a white oil. The product was recrystallized from petroleum ether.

N,N-dibutylglycine was obtained in 95% yield as a white solid having a melting point of 130°–134° C.

Example 4

The procedure of Example 3 was repeated using 13.9 parts of bromoacetic acid in place of the chloroacetic acid. A 97% yield of N,N-dibutylglycine was obtained as a white solid having a melting point of 131°–134° C.

Substantially the same results can be obtained by replacing the potassium hydroxide in the above examples with an equal number of mols of another alkali metal hydroxide such as sodium hydroxide.

It will be apparent that many modifications and variations may be effected without departing from the scope of the novel concepts of the present invention, and the illustrative details disclosed are not to be construed as imposing undue limitations on the invention.

I claim:

1. In a process for the preparation of tertiary amino carboxylic acids of the formula

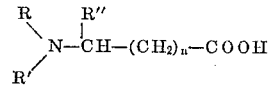

wherein R and R' are aliphatic hydrocarbon radicals having 1 to 5 carbon atoms, R" is hydrogen or an alkyl radical having 1 to 20 carbon atoms and $n$ is 0 to 2, including the steps of (a) reacting a secondary amine of the formula

with a halogen-substituted carboxylic acid of the formula

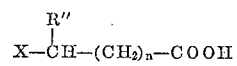

wherein there is present at least 3 mols of amine per mole of said halogen-substituted carboxylic acid, wherein R, R', R" and $n$ are as defined above and wherein X is chlorine, bromine or iodine;

(b) treating the reaction product of step (a) with an alkali metal hydroxide; and (c) recovering said tertiary amino carboxylic acid substantially free from contaminants;

the improvement comprising:

treating the reaction product of step (a) with from 0.8 to 1.2 mols of alkali metal hydroxide per mole of said halogen-substituted carboxylic acid in a reaction medium containing a polar solvent for both said alkali metal hydroxide and said tertiary amino carboxylic acid, and thereafter recovering said tertiary amino carboxylic acid from said reaction product following said treatment with alkali metal hydroxide by distilling off the volatile constituents present therein leaving a substantially non-volatile residue comprising said tertiary amino carboxylic acid, and thereafter recrystallizing said tertiary amino carboxylic acid from a non-polar solvent.

2. A process in accordance with claim 1 wherein said polar solvent is selected from the group consisting of methanol and ethanol.

3. A process in accordance with claim 1 wherein about 1 mole of alkali metal hydroxide is added per mole of halogen-substituted carboxylic acid.

4. A process in accordance with claim 1 wherein said alkali metal hydroxide is selected from the group consisting of sodium hydroxide and potassium hydroxide.

5. A process in accordance with claim 1 wherein said amine and said halogen-substituted carboxylic acid are reacted at a temperature ranging from about 0° to about 150° C.

6. A process in accordance with claim 5 wherein said temperature ranges from about 20° to about 125° C.

7. A process in accordance with claim 1 wherein said secondary amine is selected from the group consisting of diallylamine and dibutylamine.

8. A process in accordance with claim 1 wherein said halogen-substituted carboxylic acid is selected from the group consisting of $\alpha$-chloracetic acid, $\alpha$-bromoacetic acid, and $\alpha$-iodoacetic acid.

References Cited

UNITED STATES PATENTS

| 2,097,864 | 11/1937 | Platz | 260—534 |
| 2,203,009 | 6/1940 | Calcott et al. | 260—534 |
| 2,404,503 | 7/1946 | Kharasch et al. | 260—534 |
| 2,425,283 | 8/1947 | Long et al. | 260—534 |

FOREIGN PATENTS

| 164,611 | 1964 | Russia. |

LORRAINE A. WEINBERGER, Primary Examiner
ALBERT P. HALLUIN, Assistant Examiner